Patented Aug. 7, 1951

2,563,663

UNITED STATES PATENT OFFICE 2,563,663

BENZANTHRONE HALOGENATION

Frederic Sievenpiper, Alden, N. Y., assignor to Allied Chemical & Dye Corporation, New York, N. Y., a corporation of New York No Drawing. Application February 10, 1949, Serial No. 75,740

7 Claims. (Cl. 260—364)

This invention relates to halogenation of benzanthrone, more particularly to monochlorination and monobromination of benzanthrone, whereby commercially valuable dyestuff intermediates are obtained.

Various processes for monohalogenation of benzanthrone are known. One such process, which has the advantage over certain others of requiring a relatively small volume of reaction medium and of producing, with careful control, a relatively pure product, employs dry benzanthrone, preferably a purified material, suspended in a dry inert organic liquid reaction medium. Elemental halogen, particularly chlorine or bromine alone or mixed with sulfuryl chloride, is used as the halogenating agent in said process.

An object of my invention is to obtain, without necessity of further purification, a monohalogenated benzanthrone of good quality in high yield, using relatively small volumes of reaction medium. Another object is to obtain such monohalogenated benzanthrone starting from crude, wet benzanthrone. A third object is to allow use of a hydrogen halide and an oxidant as a halogenating agent for benzanthrone. Still another object is to obtain monohalogenated benzanthrone by a process which does not demand unduly close control. Other objects and advantages will appear hereinafter.

I have found that the above objects may be accomplished and monohalobenzanthrones may very advantageously be prepared in yields approaching the theoretical by a process outlined in more detail below wherein a major portion of the inert organic liquid which has heretofore been used as reaction medium in halogenations of benzanthrone is replaced by water. This discovery is the more unexpected in view of the fact that water alone as reaction medium, even when used in volumes up to 4-6 times the volumes of reaction medium used in my process, leads to relatively low yields of relatively impure products having impurities such as oxidation products and products of over-halogenation. The products of the present process are relatively free from impurities such as oxidation and polyhalogenation products of benzanthrone.

Any inert organic water-immiscible liquid may be used in accordance with my process, for example benzene, a chlorobenzene such as monochlorobenzene and ortho-dichlorobenzene, nitrobenzene, nitrotoluene, a chlorinated toluene, a paraffin hydrocarbon such as hexane, and a chlorinated paraffin hydrocarbon such as tetrachloroethane. The quantity of organic liquid used is a minor proportion of the total reaction medium, the major proportion being water. The organic liquid is suitably used in amounts between about 0.1 part and 3 parts per part of benzanthrone starting material, and water suitably amounts to between about 3 parts and 15 parts per part of benzanthrone starting material. For best results in terms of forming a reaction medium which conduces a high yield of good quality product, does not dissolve undue quantities of product, does not form unduly stable emulsions, and is economical of organic solvent, the quantity of organic solvent used is between about 0.5 and 1 part per part of benzanthrone starting material and the water used amounts to between about 3 and about 6 parts per part of benzanthrone starting material.

The chlorinating or brominating agent employed in my process may be elemental chlorine or bromine or an agent which generates chlorine or bromine. Thus hydrochloric or hydrobromic acid plus an oxidant thereof may be used. For example, hydrobromic acid may be formed in situ from sodium bromide plus sulfuric acid and may be oxidized to generate bromine by action of sodium hypochlorite or sodium bromate oxidizing agent. When an oxidizing agent is present it oxidizes hydrogen halide formed by reaction of halogen with benzanthrone, thus minimizing losses of halogen.

The benzanthrone employed as starting material need not be pure or dried, but may be, for example, crude wet press cake. It is dispersed in the mixture of organic liquid and water, preferably by use of a dispersing agent to aid formation of a homogeneous dispersion.

Temperatures of reaction are suitably from room temperature to the reflux temperature of the reaction medium, and preferably are between about 70° C. and about 95° C. Preferably the elemental halogen or the agent generating halogen is introduced about as fast as it is consumed, so that only a small excess of halogen is present during the reaction. For example, in the monobromination of benzanthrone, the rate of addition of bromine or agent generating bromine is regulated to maintain a slight visible excess of bromine in the vapors over the reaction mixture. Halogenation proceeds at a satisfactory rate under these conditions and does not tend to go on to the formation of polyhalobenzanthrones before the formation of monohalobenzanthrone is practically complete.

The following example illustrates the invention but is not to be interpreted in a limiting sense. Quantities are expressed in parts by weight. The standard dyestuff referred to is dichloroisoviolanthrone paste of commercial strength, prepared from benzanthrone by conventional procedures. The quantity of this dyestuff obtainable from a monohalogenated benzanthrone is a criterion of the yield and quality of the monohalogenated benzanthrone product.

*Example*

An aqueous press-cake containing 100 parts of technical, crude benzanthrone (i e. containing about 90 parts of benzanthrone) was fluidified by stirring it with 1 part of a formaldehyde-naphthalene sulfonic acid condensation product, and the resulting dispersion was diluted to contain 500 parts of water. 60 parts of sodium bromide, 46 parts of 100% sulfuric acid, 60 parts of monochlorobenzene, and 1 part of an alkyl benzene sodium sulfonate emulsifying agent were stirred into the mixture. The homogeneous dispersion was heated to 85–90° C., and aqueous sodium hypochlorite solution containing about 10 weight percent available chlorine was added dropwise about as fast as the bromine formed was consumed until the bromine content of a dry sample of the reaction product approached the theoretical value for monobromobenzanthrone. About 500 parts of aqueous sodium hypochlorite were thus added. The chlorobenzene was removed and recovered for reuse by distillation through a separator, wherein water was separated from the chlorobenzene and was automatically returned to the distilland. The chlorobenzene-free mixture was filtered, and the filter cake was washed free from acid with cold water, dried, and ground to a powder. 115 parts of crude Bz-1-bromobenzanthrone product, melting at 166° C. and containing 24.5% by weight of bromine (theory for monobromobenzanthrone is 25.9% bromine), were obtained. The impurities in the crude product are innocuous. They are largely carried over from the starting material, without changing to impurities which would cause difficulties in subsequent steps. The product when converted to vat dyestuff yielded 540 parts of standard dyestuff.

The organic liquid may be removed by filtration instead of distillation. Thus the reaction mixture may be cooled and filtered in a press, and the organic liquid may be washed from the press cake with water. The press cake may then be dried in an oven to remove water and any residual organic liquid. If a high boiling organic liquid has been used and must be completely removed, residual organic liquid may be steamed from the press cake.

By introducing, in a manner similar to that of the foregoing example, 25 parts of 66° Bé. sulfuric acid into a refluxing, stirred dispersion composed of 100 parts of technical, crude benzanthrone (containing 90 parts of benzanthrone), 600 parts of water, 80 parts of sodium bromide, 80 parts of chlorobenzene and 45 parts of sodium bromate, a practically theoretical yield of dry brominated benzanthrone product, weighing 125 parts, containing 25.5% bromine, and yielding 595 parts of standard dyestuff, was obtained.

100 parts of a purified benzanthrone, obtained by treating benzanthrone such as employed in the above example with sodium bichromate in dilute aqueous sulfric acid, filtering and washing the filter cake with dilute aqueous sodium carbonate, were monobrominated as in the example, in about 2500 parts of water but in the absence of an organic liquid. 115 parts of product melting at 162° C., containing 24.4% of bromine, and yielding only 495 parts of standard dyestuff were obtained.

When about 500 parts of water were used as reaction medium, in the absence of an organic liquid, in the bromination of 100 parts of crude benzanthrone by the procedure of the example the ultimate yield of standard dyestuff obtained from the monobromobenzanthrone product was only 361 parts.

I claim:

1. A process for the monohalogenation of benzanthrone which comprises heating a dispersion of benzanthrone in a mixture of water-immiscible inert organic liquid amounting to between about 0.1 part and about 3 parts per part of benzanthrone starting material, and water amounting to between about 3 parts and about 15 parts per part of benzanthrone starting material while contacting said dispersion with a halogenating agent of the group consisting of chlorinating agents and brominating agents until the halogen content of a sample of the product is about theoretical for a monohalobenzanthrone.

2. A process as defined in claim 1, wherein the organic liquid is a chlorobenzene.

3. A process as defined in claim 1, wherein the amount of organic liquid is between about 0.5 part and about 1 part per part of benzanthrone starting material and the amount of water is between about 3 parts and about 6 parts per part of benzanthrone starting material.

4. A process as defined in claim 3, wherein the benzanthrone and the organic liquid are maintained in the form of a homogeneous dispersion in water by the presence of a dispersing agent.

5. A process as defined in claim 4, wherein the organic liquid is monochlorobenzene and temperatures are maintained between about 70° C. and about 95° C.

6. A process as defined in claim 1, wherein the halogenating agent is hydrobromic acid and an oxidant thereof, the amount of organic liquid is between about 0.5 part and about 1 part per part of benzanthrone starting material and the amount of water is between about 3 parts and about 6 parts per part of benzanthrone starting material.

7. A process as defined in claim 6 wherein the organic liquid monochlorobenzene, the benzanthrone and the organic liquid are maintained in the form of a homogeneous dispersion in water by presence of a dispersing agent, temperatures are maintained between about 70° C. and about 95° C., and bromine is generated at a rate to maintain a slight visible excess of bromine in the vapors over the reaction mixture.

FREDERIC SIEVENPIPER.

REFERENCES CITED

The following references are of record in the file of this patent:

UNITED STATES PATENTS

| Number | Name | Date |
| --- | --- | --- |
| 2,418,318 | Scalera | Apr. 1, 1947 |

FOREIGN PATENTS

| Number | Country | Date |
| --- | --- | --- |
| 20,837 | Great Britain | of 1906 |